United States Patent
O'Connor

(10) Patent No.: US 9,880,655 B2
(45) Date of Patent: Jan. 30, 2018

(54) METHOD OF DISAMBIGUATING WATER FROM A FINGER TOUCH ON A TOUCH SENSOR PANEL

(71) Applicant: Apple Inc., Cupertino, CA (US)

(72) Inventor: Sean E. O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/558,529

(22) Filed: Dec. 2, 2014

(65) Prior Publication Data

US 2016/0062533 A1 Mar. 3, 2016

Related U.S. Application Data

(60) Provisional application No. 62/044,582, filed on Sep. 2, 2014.

(51) Int. Cl.
*G06F 3/041* (2006.01)
*G06F 3/0488* (2013.01)

(52) U.S. Cl.
CPC .. *G06F 3/0416* (2013.01); *G06F 2203/04808* (2013.01)

(58) Field of Classification Search
CPC .............................. G09G 3/044; G09G 3/0418
See application file for complete search history.

(56) References Cited

U.S. PATENT DOCUMENTS

| | | | |
|---|---|---|---|
| 4,087,625 A | 5/1978 | Dym et al. | |
| 4,090,092 A | 5/1978 | Serrano | |
| 4,304,976 A | 12/1981 | Gottbreht et al. | |
| 4,475,235 A | 10/1984 | Graham | |
| 4,550,221 A | 10/1985 | Mabusth | |
| 4,659,874 A | 4/1987 | Landmeier | |
| 5,194,862 A | 3/1993 | Edwards | |
| 5,317,919 A | 6/1994 | Awtrey | |
| 5,483,261 A | 1/1996 | Yasutake | |
| 5,488,204 A | 1/1996 | Mead et al. | |
| 5,631,670 A | 5/1997 | Tomiyoshi et al. | |
| 5,825,352 A | 10/1998 | Bisset et al. | |

(Continued)

FOREIGN PATENT DOCUMENTS

| | | |
|---|---|---|
| CN | 1246638 A | 3/2000 |
| CN | 1527274 A | 9/2004 |

(Continued)

OTHER PUBLICATIONS

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.

(Continued)

*Primary Examiner* — Xuemei Zheng
(74) *Attorney, Agent, or Firm* — Morrison & Foerster LLP

(57) ABSTRACT

A computer-implemented method is disclosed. The method includes: identifying a touch detected on a touch sensor panel; extracting touch information associated with the touch; calculating an overall confidence value based on the extracted touch information; comparing the confidence value with a predetermined threshold; and determining whether to identify the touch as a non-touch based on a result of the comparison.

21 Claims, 6 Drawing Sheets

(56) References Cited

U.S. PATENT DOCUMENTS

| | | |
|---|---|---|
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,412,586 B1 | 8/2008 | Rajopadhye et al. |
| 7,504,833 B1 | 3/2009 | Seguine |
| 7,538,760 B2 | 5/2009 | Hotelling et al. |
| 7,548,073 B2 | 6/2009 | MacKey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,902,172 B2 | 12/2014 | Peng et al. |
| 8,922,521 B2 | 12/2014 | Hotelling et al. |
| 8,957,874 B2 | 2/2015 | Elias |
| 8,982,096 B2 | 3/2015 | Hong et al. |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,261,997 B2 | 2/2016 | Chang et al. |
| 9,280,251 B2 | 3/2016 | Shih |
| 9,329,723 B2 | 5/2016 | Benbasat et al. |
| 9,372,576 B2 | 6/2016 | Westerman |
| 9,582,131 B2 | 2/2017 | Elias |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |
| 2007/0285365 A1 | 12/2007 | Lee |
| 2008/0006454 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1* | 7/2008 | Westerman ........... G06F 3/0418 345/156 |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |

(56) References Cited

U.S. PATENT DOCUMENTS

| | | |
|---|---|---|
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156846 A1 | 6/2010 | Long et al. |
| 2010/0194696 A1 | 8/2010 | Chang et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328228 A1 | 12/2010 | Elias |
| 2010/0328248 A1 | 12/2010 | Mozdzyn |
| 2011/0007020 A1 | 1/2011 | Hong et al. |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026099 A1 | 2/2012 | Harley |
| 2012/0044199 A1 | 2/2012 | Karpin et al. |
| 2012/0050216 A1 | 3/2012 | Kremin et al. |
| 2012/0056662 A1 | 3/2012 | Wilson et al. |
| 2012/0056851 A1 | 3/2012 | Chen et al. |
| 2012/0092288 A1 | 4/2012 | Wadia |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0057511 A1 | 3/2013 | Shepelev et al. |
| 2013/0069911 A1 | 3/2013 | You |
| 2013/0076648 A1 | 3/2013 | Krah et al. |
| 2013/0120303 A1 | 5/2013 | Hong et al. |
| 2013/0127739 A1 | 5/2013 | Guard et al. |
| 2013/0141383 A1* | 6/2013 | Woolley .................. G06F 3/044 345/174 |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |
| 2013/0215049 A1 | 8/2013 | Lee |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0307821 A1 | 11/2013 | Kogo |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1* | 3/2014 | Sugiura .................. G06F 3/044 345/174 |
| 2014/0078096 A1 | 3/2014 | Tan et al. |
| 2014/0104225 A1* | 4/2014 | Davidson .............. G06F 3/044 345/174 |
| 2014/0104228 A1 | 4/2014 | Chen et al. |
| 2014/0132560 A1 | 5/2014 | Huang et al. |
| 2014/0145997 A1 | 5/2014 | Tiruvuru |
| 2014/0168540 A1 | 6/2014 | Wang et al. |
| 2014/0240291 A1 | 8/2014 | Nam |
| 2014/0247245 A1* | 9/2014 | Lee ....................... G06F 3/0416 345/174 |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0347574 A1 | 11/2014 | Tung et al. |
| 2014/0362034 A1 | 12/2014 | Mo et al. |
| 2014/0368436 A1* | 12/2014 | Abzarian .............. G06F 3/0488 345/168 |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0015528 A1 | 1/2015 | Vandermeijden |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0103047 A1 | 4/2015 | Hanauer et al. |
| 2015/0123939 A1 | 5/2015 | Kim et al. |
| 2015/0227240 A1 | 8/2015 | Hong et al. |
| 2015/0242028 A1* | 8/2015 | Roberts .................. G06F 3/044 345/173 |
| 2015/0253907 A1 | 9/2015 | Elias |
| 2015/0309610 A1 | 10/2015 | Rabii et al. |
| 2015/0370387 A1* | 12/2015 | Yamaguchi ............ G06F 3/047 345/174 |
| 2015/0378465 A1 | 12/2015 | Shih et al. |
| 2016/0154505 A1 | 6/2016 | Chang |
| 2016/0154529 A1 | 6/2016 | Westerman |

(56) References Cited

U.S. PATENT DOCUMENTS

| | | |
|---|---|---|
| 2016/0224177 A1 | 8/2016 | Krah |
| 2016/0224189 A1 | 8/2016 | Yousefpor et al. |
| 2016/0266676 A1 | 9/2016 | Wang et al. |
| 2016/0266679 A1 | 9/2016 | Shahparnia et al. |
| 2016/0283023 A1 | 9/2016 | Shin et al. |
| 2016/0357344 A1 | 12/2016 | Benbasat et al. |
| 2017/0090619 A1 | 3/2017 | Yousefpor |
| 2017/0139539 A1 | 5/2017 | Yao et al. |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 103294321 A | 9/2013 |
| CN | 103809810 A | 5/2014 |
| CN | 104020908 A | 9/2014 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |
| JP | 2008-510251 A | 4/2008 |
| JP | 2008-225415 A | 9/2008 |
| KR | 10-20040091728 A | 10/2004 |
| KR | 10-20070002327 A | 1/2007 |
| KR | 10-2013-0094495 A | 8/2013 |
| KR | 10-2013-0117499 A | 10/2013 |
| KR | 10-2014-0074454 A | 6/2014 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442 A1 | 5/2011 |
| TW | 201401129 A | 1/2014 |
| TW | 201419071 A | 5/2014 |
| WO | WO-99/35633 A | 7/1999 |
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/127716 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2016/144437 A1 | 9/2016 |
| WO | WO-2017/058415 A1 | 4/2017 |

OTHER PUBLICATIONS

Chinese Search Report completed Dec. 14, 2011, for CN Patent Application No. ZL201020108330X, filed Feb. 2, 2010, with English Translation, 22 pages.

Chinese Search Report completed May 18, 2015, for CN Patent Application No. 201310042816.6, filed Feb. 2, 2010, two pages.

European Search Report dated Jul. 21, 2010, for EP Patent Application 10151969.2, six pages.

European Search Report dated Dec. 3, 2012, for EP Patent Application No. 12162177.5, seven pages.

European Search Report dated Feb. 13, 2013, for EP Patent Application No. 12192450.0, six pages.

European Search Report dated Aug. 31, 2015, for EP Application No. 15166813.4, eight pages.

Final Office Action dated Jan. 5, 2012, for U.S. Appl. No. 12/206,680, filed Sep. 8, 2008, 15 pages.

Final Office Action dated Jan. 3, 2013, for U.S. Appl. No. 11/818,498, filed Jun. 13, 2007, 17 pages.

Final Office Action dated Feb. 1, 2013, for U.S. Appl. No. 12/642,466, filed Dec. 18, 2009, nine pages.

Final Office Action dated Feb. 5, 2013, for U.S. Appl. No. 12/500,911, filed Jul. 10, 2009, 15 pages.

Final Office Action dated Apr. 30, 2013, for U.S. Appl. No. 12/494,173, filed Jun. 29, 2009, seven pages.

Final Office Action dated May 22, 2013, for U.S. Appl. No. 12/206,680, filed Sep. 8, 2008, 16 pages.

Final Office Action dated Jun. 21, 2013, for U.S. Appl. No. 12/545,754, filed Aug. 21, 2009, six pages.

Final Office Action dated Jul. 19, 2013, for U.S. Appl. No. 12,545,604, filed Aug. 21, 2009, 17 pages.

Final Office Action dated Jan. 27, 2014, for U.S. Appl. No. 12/206,680, filed Sep. 8, 2008, 20 pages.

Final Office Action dated Apr. 23, 2014 for U.S. Appl. No. 12/847,987, filed Jul. 30, 2010, 16 pages.

Final Office Action dated May 9, 2014, for U.S. Appl. No. 12/642,466, filed Dec. 18, 2009, 13 pages.

Final Office Action dated Jul. 16, 2014, for U.S. Appl. No. 12/545,604, filed Aug. 21, 2009, 18 pages.

Final Office Action dated Nov. 12, 2015, for U.S. Appl. No. 14/082,074, filed Nov. 15, 2013, 22 pages.

Final Office Action dated Jan. 4, 2016, for U.S. Appl. No. 14/082,003, filed Nov. 15, 2013, 25 pages.

(56) References Cited

OTHER PUBLICATIONS

International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, four pages.
International Search Report dated May 2, 2011, for PCT Application No. PCT/US2010/058988, filed Dec. 3, 2010, five pages.
International Search Report dated Sep. 24, 2104, for PCT Application No. PCT/US/2014/39245, three pages.
International Search Report dated Dec. 12, 2014, for PCT Application No. PCT/US2014/56795, two pages.
International Search Report dated Jan. 29, 2015, for PCT Application No. PCT/US2014/047888, filed Jul. 23, 2014, six pages.
Non-Final Office Action dated Feb. 4, 2011, for U.S. Appl. No. 12/038,760, filed Feb. 27, 2008, 18 pages.
Non-Final Office Action dated Jun. 9, 2011, for U.S. Appl. No. 12/206,680, filed Sep. 8, 2008, 13 pages.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final office Action dated Jan. 7, 2013, for U.S. Appl. No. 12/545,604, filed Aug. 21, 2009, 12 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 13 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, nine pages.
Non-Final Office Action dated Apr. 10, 2014, for U.S. Appl. No. 14/055,717, filed Oct. 16, 2013, 10 pages.
Non-Final Office Action dated Apr. 10, 2015, for U.S. Appl. No. 14/082,074, filed Nov. 15, 2013, 23 pages.
Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, 10 pages.
Non-Final Office Action dated Oct. 5, 2015, for U.S. Appl. No. 13/899,391, filed May 21, 2013, 10 pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Notice of Allowance dated Jun. 10, 2013, for U.S. Appl. No. 12/545,557, filed Aug. 21, 2009, nine pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, nine pages.
Notice of Allowance dated Aug. 21, 2014, for U.S. Appl. No. 12/545,754, filed Aug. 21, 2009, eight pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, 10 pages.
Search Report dated Apr. 29, 2009, for NL Application No. 2001672, with English translation of Written Opinion, eight pages.
Search Report dated Oct. 14, 2015, for TW Application No. 103116003, one page.
Search Report dated Nov. 12, 2015, for ROC (Taiwan) Patent Application No. 103105965, with English translation, two pages.
Yang, J-H. et al. (Jul. 2013). "A Noise-Immune High-Speed Readout Circuit for In-Cell Touch Screen Panels," IEEE Transactions on Circuits and Systems—1: Regular Papers 60(7):1800-1809.
Final Office Action dated Jun. 11, 2015, for U.S. Appl. No. 13/448,182, filed Apr. 16, 2012, 12 pages.
Final Office Action dated Oct. 22, 2014, for U.S. Appl. No. 13/448,182, filed Apr. 16, 2012, 11 pages.
International Search Report dated Aug. 6, 2013, for PCT Application No. PCT/US2013/036662, filed Apr. 15, 2013, three pages.
Non-Final Office Action dated Jan. 31, 2014, for U.S. Appl. No. 13/448,182, filed Apr. 16, 2012, 18 pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
European Search Report dated Apr. 25, 2012, for EP Patent Application No. 08022505.5, 12 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Oct. 22, 2014, for U.S. Appl. No. 12/238,342, filed Sep. 25, 2008, 16 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Malik, S. et al. (2004). "Visual Touchpad: A Two-Handed Gestural Input Device," *Proceedings of the 6th International Conference on Multimodal Interfaces,* State College, PA, Oct. 13-15, 2004, *ICMI '04, ACM* pp. 289-296.
Non-Final Office Action dated Mar. 9, 2012, for U.S. Appl. No. 12/238,342, filed Sep. 25, 2008, 26 pages.
Non-Final Office Action dated May 3, 2012, for U.S. Appl. No. 12/238,333, filed Sep. 25, 2008, 22 pages.
Non-Final Office Action dated Jan. 7, 2013, for U.S. Appl. No. 12/238,333, filed Sep. 25, 2008, 20 pages.
Non-Final Office Action dated Feb. 15, 2013, for U.S. Appl. No. 12/238,342, filed Sep. 25, 2008, 15 pages.
Non-Final Office Action dated Mar. 12, 2014, for U.S. Appl. No. 12/238,342, filed Sep. 25, 2008, 15 pages.
Non-Final Office Action dated Sep. 18, 2014, for U.S. Appl. No. 12/238,333, filed Sep. 25, 2008, 21 pages.
Rekimoto, J. (2002). "SmartSkin: An Infrastructure for Freehand Manipulation on Interactive Surfaces," *CHI 2002,* Apr. 20-25, 2002. [(Apr. 20, 2002). 4(1):113-120.].
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware

(56) References Cited

OTHER PUBLICATIONS in Partial Fulfillment of the Requirements for the Degree of Doctor of Philosophy in Electrical Engineering, 364 pages.
Wilson, A.D. (Oct. 15, 2006). "Robust Computer Vision-Based Detection of Pinching for One and Two-Handed Gesture Input," *ACM, USIT '06,* Montreux, Switzerland, Oct. 15-18, 2006, pp. 255-258.
International Search Report dated Jan. 8, 2016, for PCT Application No. PCT/US2015/057644, filed Oct. 27, 2015, four pages.
Final Office Action dated Apr. 22, 2015, for U.S. Appl. No. 12/238,333, filed Sep. 25, 2008, 23 pages.
Final Office Action dated Jan. 29, 2016, for U.S. Appl. No. 12/642,466, filed Dec. 18, 2009, nine pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
TW Search Report dated May 3, 2016, for TW Application No. 104115152, one page.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
Final Office Action dated Nov. 4, 2016, for U.S. Appl. No. 14/082,003, filed Nov. 15, 2013, 18 pages.
Non-Final Office Action dated Dec. 14, 2016, for U.S. Appl. No. 14/550,686, filed Nov. 21, 2014, eight pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Notice of Allowance dated Dec. 2, 2016, for U.S. Appl. No. 14/615,186, filed Feb. 5, 2015, seven pages.
European Search Report dated Jul. 27, 2017, for EP Application No. 14902458.0, four pages.
Final Office Action dated Jul. 26, 2017, for U.S. Appl. No. 14/318,157, filed Jun. 27, 2014, ten pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Non-Final Office Action dated Jun. 14, 2017, for U.S. Appl. No. 15/006,987, filed Jan. 26, 2016, 14 pages.
Non-Final Office Action dated Sep. 14, 2017, for U.S. Appl. No. 15/017,463, dated Feb. 5, 2016, 22 pages.
Notice of Allowance dated Sep. 20, 2017, for U.S. Appl. No. 14/062,003, filed Nov. 15, 2013, eight pages.
Notice of Allowance dated Sep. 20, 2017, for U.S. Appl. No. 15/144,706, filed May 2, 2016, nine pages.

\* cited by examiner

METHOD OF DISAMBIGUATING WATER FROM A FINGER TOUCH ON A TOUCH SENSOR PANEL

FIELD

This relates generally to touch input processing and filtering unintended touches detected on a touch sensor panel, and more particularly, to disambiguating water on the touch sensor panel from a finger touch.

BACKGROUND

In recent years, touch sensor panels, touch screens, and the like have become available as input devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel, that can be positioned partially or fully behind the touch sensor panel so that the touch-sensitive surface can cover at least a portion of the viewable area of the display device. Touch screens can allow a user to perform various functions by touching the touch sensor panel using a finger, stylus, or other object at a location often dictated by a user interface (UI) being displayed by the display device. In general, touch screens can recognize a touch event and the position of the touch event on the touch sensor panel, and a computing system can then interpret the touch event in accordance with the display appearing at the time of the touch event, and thereafter can perform one or more actions based on the touch event.

Touch sensor panels can include an array of touch sensors capable of detecting touch events (the touching by an object such as a finger upon a touch-sensitive surface). Some current touch panels are able to detect multiple touches (e.g., the touching of multiple fingers upon a touch-sensitive surface at distinct locations at about the same time) and near touches (e.g., fingers within the near-field detection capabilities of their touch sensors), and identify and track their locations.

In reality, however, not all touches detected on a touch sensor panel are intended user input. For example, when water drops on the surface of the touch sensor panel and makes contact with the metal housing of the device (or other conductive material such as a finger), it can become grounded and cause a similar effect on the touch sensor panel as a finger. Without a way for disambiguating a water drop from a finger, the water drop may be processed as an intended user input, causing an unintended response by the device. This can negatively affect user experience.

SUMMARY

In general, this disclosure relates to a system and method of disambiguating water from a finger touch on a touch sensor panel. As will be detailed in the embodiments below, after a touch image indicating at least one touch is captured on the touch sensor panel, the touch image can be analyzed to extract information such as the distance from the touch to an edge of the touch sensor panel (or the device), an area and density associated with the touch. A confidence value can then be calculated for each of the at least one touch based on its distance to edge, touch area and/or density. The confidence value can indicate whether each of the at least one touch is likely caused by water instead of a finger. The touch controller or a processor of the device can ignore any touches that are likely caused by water on the touch surface based on the confidence value so that a water drop on the touch surface would not result in any unintended response by the device. In some embodiments, each touch detected on the touch sensor panel can be tracked over multiple touch scan frames so that, after a touch is determined to be caused by water, the touch controller or processor does not have to reevaluate the touch over and over again and can ignore the touch as the water drop moves across the touch surface.

DETAILED DESCRIPTION OF THE PREFERRED EMBODIMENTS

In the following description of preferred embodiments, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

In general, this disclosure relates to a system and method of disambiguating water from a finger touch on a touch sensor panel. As referred hereinafter, the terms "touch screen," "touch sensor panel," "touch panel," "touchpad," etc. are used interchangeably to describe any touch-sensing input devices. The terms "electronic device," "host device," and "device" are also used interchangeably to describe any electronic device with a touch-sensing capability. The terms "water" and "water drop" are intended to refer to any type of liquid that can come in contact with a touch panel.

As will be detailed in the embodiments below, after a touch image indicating at least one touch is captured on the touch sensor panel, the touch image can be analyzed to extract information such as the distance from the touch to an edge of the touch sensor panel (or the device), an area and density associated with the touch. A confidence value can then be calculated for each of the at least one touch based on its distance to edge, touch area and/or density. The confidence value can indicate whether each of the at least one touch is likely caused by water instead of a finger. The touch controller or a processor of the device can ignore any touches that are likely caused by water on the touch surface based on the confidence value so that a water drop on the touch surface would not result in any unintended response by the device. In some embodiments, each touch detected on the touch sensor panel can be tracked over multiple touch scan frames so that, after a touch is determined to be caused by water, the touch controller or processor does not have to reevaluate the touch over and over again and can ignore the touch as the water drop moves across the touch surface.

FIGS. 1-4 illustrate an exemplary structure and operation of a touch-sensing system including, for example, a touch screen, accordingly to an embodiment of the disclosure. FIGS. 5-10 describe various embodiments of systems and methods of disambiguating a touch by water from a finger touch. It should be understood that the systems and methods of this disclosure can be adopted by any suitable touch sensing systems without departing from the spirit of the disclosure.

Figure 1:
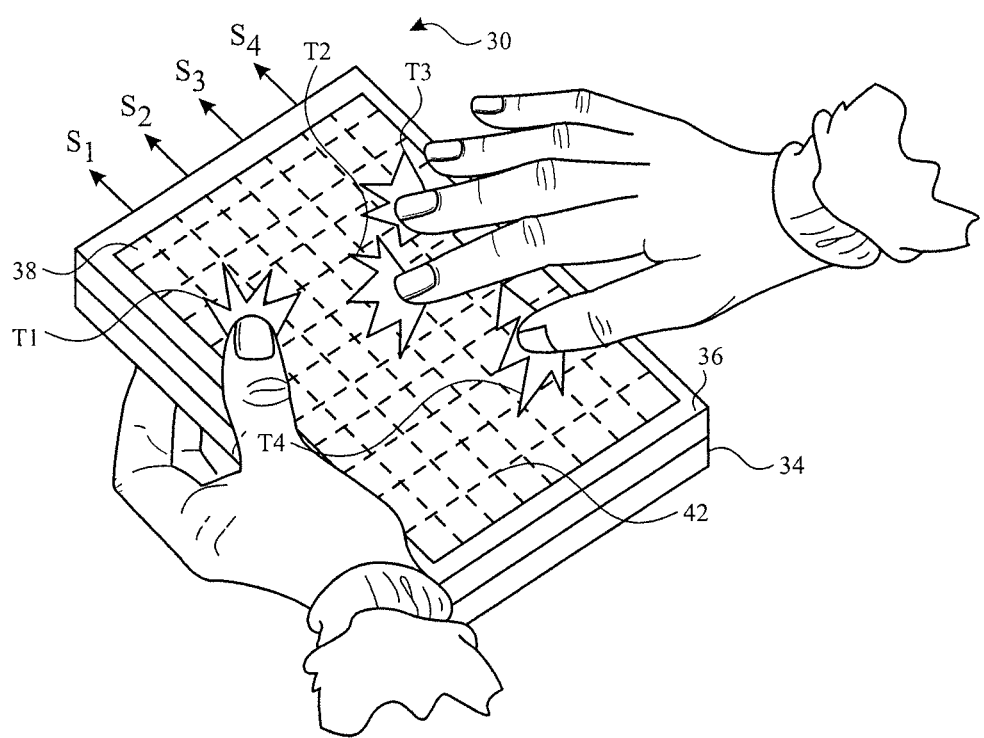
FIG. 1 is a perspective view of a touch input device, in accordance with an embodiment of the present disclosure.

FIG. 1 is a perspective view of a touch input device 30 of an electronic device (or host device), in accordance with one embodiment of the present disclosure. The touch input device 30 can include a display 34 and a transparent touch screen 36 positioned in front of the display 34. The display 34 can be configured to display a graphical user interface (GUI) including perhaps a pointer or cursor as well as other information to the user. In some embodiments, the display 34 can be optional. The transparent touch screen 36, on the other hand, can be an input device that is sensitive to a user's touch, allowing a user to interact with the graphical user interface on the display 34. By way of example, the touch screen 36 can allow a user to move an input pointer or make selections on the graphical user interface by simply pointing at the GUI on the display 34. In some embodiments, the touch screen 35 is not necessarily transparent.

In general, touch screen 36 can recognize a touch event on the surface 38 of the touch screen 36 and thereafter output this information to the host device. The host device may for example correspond to a computer such as a desktop, laptop, handheld or tablet computer, smartphone, digital media player, wearable device, or any electronic device with touch-sensing capability. The host device can interpret the touch event and thereafter perform an action based on the touch event. The touch screen 36 shown herein can be configured to recognize one or more touch events that occur at different locations on the touch sensitive surface 38 of the touch screen 36 at the same time. That is, the touch screen 36 can allow for multiple contact points T1-T4 to be tracked simultaneously. As shown, the touch screen 36 can generate separate tracking signals S1-S4 for each touch point T1-T4 that can occur on the surface of the touch screen 36 at the same time.

The one or more touch events can be used separately or together to perform singular or multiple actions in the host device. When used separately, a first touch event may be used to perform a first action while a second touch event may be used to perform a second action that is different than the first action. The actions may for example include moving an object such as a cursor or pointer, scrolling or panning, adjusting control settings, opening a file or document, viewing a menu, making a selection, executing instructions, operating a peripheral device connected to the host device etc. When used together, first and second touch events may be used for performing one particular action. The particular action may for example include logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Recognizing one or more touch events is generally accomplished with a touch sensing arrangement. The multipoint sensing arrangement can simultaneously detect and monitor touches and the magnitude of each of those touches at distinct points across the touch sensitive surface 38 of the touch screen 36. The touch sensing arrangement can generally provide a plurality of transparent sensor coordinates or nodes 42 that work independent of one another and that represent different points on the touch screen 36. When one or more objects are pressed against the touch screen 36, one or more sensor coordinates are activated for each touch point as for example touch points T1-T4. The sensor coordinates 42 associated with each touch point T1-T4 can produce the tracking signals S1-S4.

In one embodiment, the touch screen 36 includes a plurality of capacitance sensing nodes 42. The capacitive sensing nodes may be widely varied. For example, the capacitive sensing nodes may be based on self capacitance or mutual capacitance. In self capacitance, the "self" capacitance of a single electrode can be measured as for example relative to ground. In mutual capacitance, the mutual capacitance between at least first and second electrodes can be measured. In either case, each of the nodes 42 can work independent of the other nodes 42 so as to produce simultaneously occurring signals representative of different points on the touch screen 36.

In the embodiments where the touch screen 36 is transparent, the capacitance sensing nodes 42 can be formed with a transparent conductive medium such as indium tin oxide (ITO). In self capacitance sensing arrangements, the transparent conductive medium can be patterned into spatially separated electrodes and traces. Each of the electrodes can represent a different coordinate and the traces connect the electrodes to a capacitive sensing circuit. The coordinates may be associated with Cartesian coordinate system (x and y), Polar coordinate system (r, ✓) or some other coordinate system. In a Cartesian coordinate system, the electrodes may be positioned in columns and rows so as to form a grid array with each electrode representing a different x, y coordinate. During operation, the capacitive sensing circuit can monitor changes in capacitance that occur at each of the electrodes. The positions where changes occur and the magnitude of those changes are used to help recognize the one or more touch events. A change in capacitance can typically occur at an electrode when a user places an object such as a finger in close proximity to the electrode, i.e., the object steals charge thereby affecting the capacitance.

In mutual capacitance, the transparent conductive medium can be patterned into a group of spatially separated lines formed on the same layer or two different layers. The sensing lines can traverse, intersect, or cut across the driving lines thereby forming a capacitive coupling node. The manner in which the sensing lines cut across the driving lines can generally depend on the coordinate system used. For example, in a Cartesian coordinate system, the sensing lines can be perpendicular to the driving lines thereby forming nodes with distinct x and y coordinates. Alternatively, in a polar coordinate system, the sensing lines may be concentric circles and the driving lines may be radially extending lines (or vice versa). The driving lines can be connected to a voltage source and the sensing lines can be connected to capacitive sensing circuit. During operation, a current can be driven through one driving line at a time, and because of capacitive coupling, the current can be carried through to the sensing lines at each of the nodes (e.g., intersection points). Furthermore, the sensing circuit can monitor changes in capacitance that occurs at each of the nodes. The positions where changes occur and the magnitude of those changes can be used to help recognize the multiple touch events. A change in capacitance can typically occur at a capacitive coupling node when a user places an object such as a finger in close proximity to the capacitive coupling node, i.e., the object steals charge thereby affecting the capacitance.

In the embodiments disclosed below, the same change in capacitance can also occur when one or more drops of water come in contact with the touch surface and somehow become grounded. It can happen when the water is in contact with the user (e.g., the user's hand) or a part of the device that is conductive (e.g., the metal bezel of a smart phone).

Figure 2:
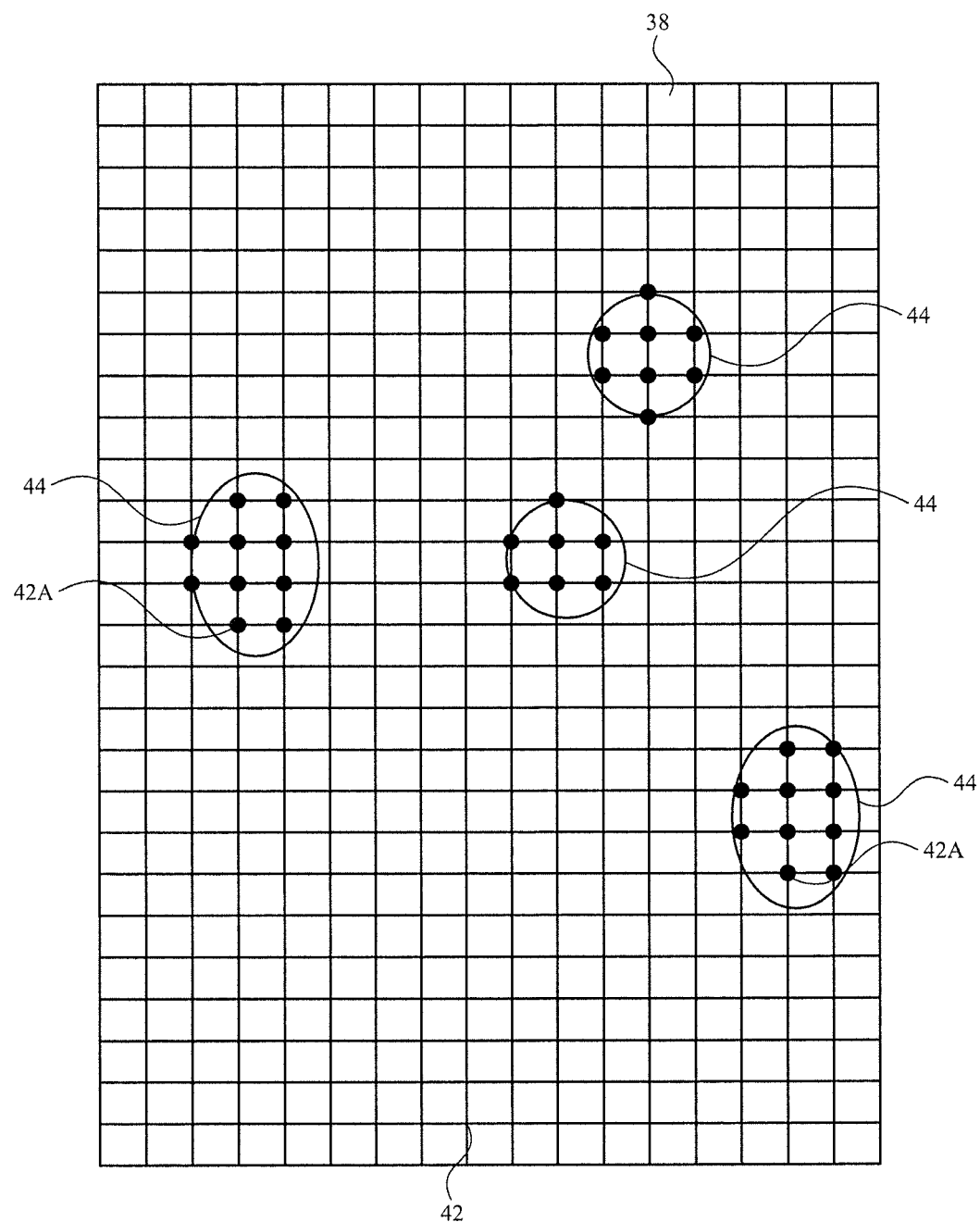
FIG. 2 illustrates a touch image captured from the touch screen at a particular point in time, according to an embodiment of the disclosure.

By way of example, the signals generated at the nodes 42 of the touch screen 36 may be used to produce an image of the touch screen plane at a particular point in time. Referring to FIG. 2, each object in contact with a touch sensitive surface 38 of the touch screen 36 can produce a contact patch area 44. Each of the contact patch areas 44 can cover several nodes 42. The covered nodes 42 can detect surface contact while the remaining nodes 42 do not detect surface contact. As a result, a pixilated image of the touch screen plane can be formed. The signals for each contact patch area 44 may be grouped together to form individual images representative of the contact patch area 44. The image of each contact patch area 44 may include high and low points based on the pressure at each point. The shape of the image as well as the high and low points within the image may be used to differentiate contact patch areas 44 that are in close proximity to one another. Furthermore, the current image, and more particularly the image of each contact patch area 44 can be compared to previous images to determine whether the touches have moved and what action to perform in a host device.

As will be discussed in detail below, the touch image can also reveal the distance from each touch to the edge of the touch screen. Additionally or alternatively, the touch image can also include information such as a touch area ($Z_{area}$) and a touch density ($Z_{density}$) associated with each touch on the touch surface. The information extracted from the touch image can be used to determine whether a touch is likely a finger touch or a water touch.

Referring back to FIG. 1, the display arrangement 30 may be a standalone unit or it may integrated with other devices. When stand alone, the display arrangement 32 (or each of its components) can act like a peripheral device (monitor) that includes its own housing and that can be coupled to a host device through wired or wireless connections. When integrated, the display arrangement 30 can share a housing and be hard wired into the host device thereby forming a single unit. By way of example, the display arrangement 30 may be disposed inside a variety of host devices including but not limited to general purpose computers such as a desktop, laptop or tablet computers, handhelds such as smartphones and media players such as music players, peripheral devices such as cameras, printers and/or the like, or wearable devices.

Figure 3:
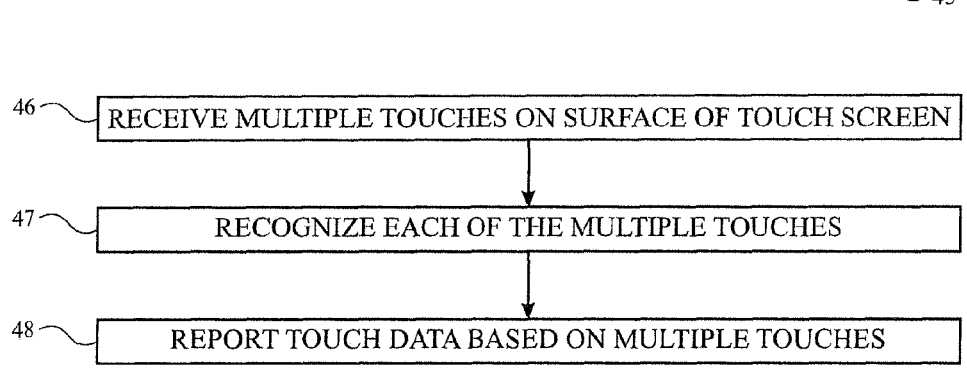
FIG. 3 is a flow chart illustrating the exemplary steps of a touch processing method, according to an embodiment of the disclosure.

FIG. 3 illustrates the exemplary steps in a method 45 of detecting one or more touches on the device of FIG. 1, in accordance with an embodiment of the present disclosure. The method can begin at block 46 where one or more touches are received on the surface of the touch screen. The touches can be by fingers placed on the surface of the touch screen. Alternatively, one or more of the touches can result from grounded water drops on the surface of the touch screen. Following block 46, the process flow can proceed to block 47 where each of the one or more touches can be separately recognized by the touch screen. This may for example be accomplished by the capacitance sensors located within the touch screen. Following block 47, the process flow can proceed to block 48 where the touch data based on the one or more touches can be reported to, for example, a touch controller (or any other types of processor) of the host device.

Figure 4:
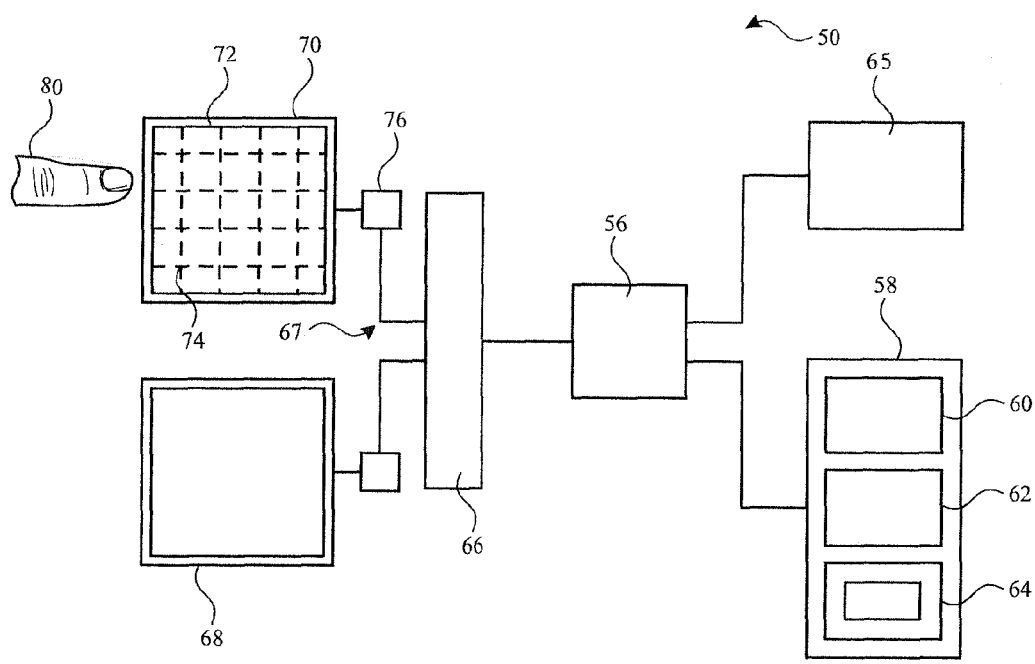
FIG. 4 is a block diagram illustrating the exemplary components of a touch-enabled electronic device, according to an embodiment of the disclosure.

FIG. 4 is a block diagram illustrating the exemplary components of a host device 50, in accordance with one embodiment of the present disclosure. The host device 50 may correspond to any electronic device such as a desktop, laptop, tablets, smartphones, digital media player, wearable device, etc. As shown, the host device 50 can include a processor 56 configured to execute instructions and to carry out operations associated with the host device 50. For example, using instructions retrieved from, for example, memory, the processor 56 may control the reception and manipulation of input and output data between components of the host device 50. The processor 56 can be a single-chip processor or can be implemented with multiple components.

In most cases, the processor 56 together with an operating system can operate to execute computer code and produce and use data. The computer code and data may reside within a program storage block 58 that is operatively coupled to the processor 56. Program storage block 58 can generally provide a place to hold data that is being used by the host device 50. By way of example, the program storage block may include Read-Only Memory (ROM) 60, Random-Access Memory (RAM) 62, hard disk drive 64 and/or the like. The computer code and data could also reside on a removable storage medium 65 and loaded or installed onto the computer system when needed. Removable storage mediums 65 can include, for example, CD-ROM, PC-CARD, floppy disk, magnetic tape, and a network component.

The host device 50 can also include an input/output (I/O) controller 66 that is operatively coupled to the processor 56. The (I/O) controller 66 may be integrated with the processor 56 or it may be a separate component as shown. The I/O controller 66 can be configured to control interactions with one or more I/O devices. The I/O controller 66 can operate by exchanging data between the processor and the I/O devices that desire to communicate with the processor. The I/O devices and the I/O controller can communicate through a data link 67. The data link 67 may be a one way link or two way link. In some cases, the I/O devices may be connected to the I/O controller 66 through wired connections. In other cases, the I/O devices may be connected to the I/O controller 66 through wireless connections. By way of example, the data link 67 may correspond to PS/2, USB, Firewire, IR, RF, Bluetooth or the like.

The host device 50 can also include a display device 68 that is operatively coupled to the processor 56. The display device 68 may be a separate component (peripheral device) or it may be integrated with the processor and program storage in a single device. The display device 68 is configured to display a graphical user interface (GUI) including perhaps a pointer or cursor as well as other information to the user.

The host device 50 can also include a touch screen 70 that is operatively coupled to the processor 56. The touch screen 70 can be a transparent panel that is positioned in front of the display device 68. The touch screen 70 may be integrated with the display device 68 or it may be a separate component. The touch screen 70 can be configured to receive input from a user's touch and to send this information to the processor 56. In most cases, the touch screen 70 can recognize touches and the position and/or magnitude of touches on its surface. The touch screen 70 can report the touches to the processor 56 and the processor 56 can interpret the touches in accordance with its programming. For example, the processor 56 may initiate a task in accordance with a particular touch.

In accordance with one embodiment, the touch screen 70 can track one or more multiple objects, which rest on, tap on, or move across the touch sensitive surface of the touch screen. The objects may for example correspond to fingers, palms, or any other grounded objects such as water drops. To elaborate, the touch screen 70 can include a sensing device 72 configured to detect an object in close proximity thereto and/or the pressure exerted thereon. The sensing device 72 may be widely varied. In one particular embodiment, the sensing device 72 can be divided into several independent and spatially distinct sensing points, nodes or regions 74 that are positioned throughout the touch screen 70. The sensing points 74, which can be hidden from view, are dispersed about the touch screen 70 with each sensing point 74 representing a different position on the surface of the touch screen 70 (or touch screen plane). The sensing points 74 may be positioned in a grid or a pixel array where each pixilated sensing point 74 is capable of generating a signal at the same time. In the simplest case, a signal can be produced each time an object is positioned over a sensing point 74. When an object is placed over multiple sensing points 74 or when the object is moved between or over multiple sensing point 74, multiple signals can be generated.

The number and configuration of the sensing points 74 may be widely varied. The number of sensing points 74 generally depends on the desired sensitivity as well as the desired transparency of the touch screen 70. More nodes or sensing points can generally increase sensitivity, but reduce transparency (and vice versa). With regards to configuration, the sensing points 74 can map the touch screen plane into a coordinate system such as a Cartesian coordinate system, a Polar coordinate system, or some other coordinate system. When a Cartesian coordinate system is used (as shown), the sensing points 74 can correspond to x and y coordinates. When a Polar coordinate system is used, the sensing points can correspond to radial (r) and angular coordinates (✓).

The touch screen 70 can include a sensing circuit 76 that acquires the data from the sensing device 72 and that supply the acquired data to the processor 56. Alternatively, the processor may include this functionality. In one embodiment, the sensing circuit 76 can be configured to send raw data to the processor 56 so that the processor 56 can process the raw data. For example, the processor 56 can receive data from the sensing circuit 76 and then determine how the data is to be used within the host device 50. The data may include the coordinates of each sensing point 74 as well as the pressure exerted on each sensing point 74. In another embodiment, the sensing circuit 76 can be configured to process the raw data itself. That is, the sensing circuit 76 can read the pulses from the sensing points 74 and turns them into data that the processor 56 can understand. The sensing circuit 76 may perform filtering and/or conversion processes. Filtering processes are typically implemented to reduce a busy data stream so that the processor 56 is not overloaded with redundant or non-essential data. In some embodiments, the process 56 can perform at least some of the data filtering. The conversion processes may be implemented to adjust the raw data before sending or reporting them to the processor 56. The conversions may include determining the center point for each touch region (e.g., centroid).

As will be detailed below, it is possible that some of the touch data captured from the touch screen is not from an intentional touch input from a user. For example, when the touch screen is exposed to water (e.g., rain, shower, sweat), one or more water drops may accumulate on the touch surface. When grounded, the one or more water drops can be detected as a contact on the touch surface just like finger touches. If not filtered, the touches by the water drops may be processed, erroneously, as valid input from the touch sensor. This can cause unintended responses from the host device. As such, one of the filtering steps, as detailed below, can be filtering out touches that were caused by water drops on the touch screen.

Referring back to FIG. 4, the sensing circuit 76 may include a storage element for storing a touch screen program, which is a capable of controlling different aspects of the touch screen 70. For example, the touch screen program may contain what type of value to output based on the sensing points 74 selected (e.g., coordinates). In fact, the sensing circuit in conjunction with the touch screen program may follow a predetermined communication protocol. As is generally well known, communication protocols are a set of rules and procedures for exchanging data between two devices. Communication protocols be used for transmitting information in data blocks or packets that contain the data to be transmitted, the data required to direct the packet to its destination, and the data that corrects errors that occur along the way. By way of example, the sensing circuit may place the data in a HID format (Human Interface Device).

The sensing circuit 76 can include one or more microcontrollers, each of which monitors one or more sensing points 74. The microcontrollers may, for example, correspond to an application specific integrated circuit (ASIC), which can work with firmware to monitor the signals from the sensing device 72 and to process the monitored signals and to report this information to the processor 56.

In accordance with one embodiment, the sensing device 72 can be based on capacitance. As should be appreciated, whenever two electrically conductive members come close to one another without actually touching, their electric fields can interact to form capacitance. In most cases, the first electrically conductive member can be a sensing point 74 and the second electrically conductive member can be an object 80 such as a finger or a grounded water drop. As the object 80 approaches the surface of the touch screen 70, a tiny capacitance can form between the object 80 and the sensing points 74 in close proximity to the object 80. By detecting changes in capacitance at each of the sensing points 74 and noting the position of the sensing points, the sensing circuit can recognize one or more objects, and determine the location, pressure, direction, speed and/or acceleration of the objects 80 as they are moved across the touch screen 70. For example, the sensing circuit can determine when and where each of the fingers and palm of one or more hands (and water drop) are touching as well as the pressure being exerted by the finger and palm of the hand(s) (and water drop) at the same time.

The simplicity of capacitance can allow for a great deal of flexibility in design and construction of the sensing device 72. By way of example, the sensing device 72 may be based on self capacitance or mutual capacitance. In self capacitance, each of the sensing points 74 can be provided by an individual charged electrode. As an object approaches the surface of the touch screen 70, the object capacitive can couple to those electrodes in close proximity to the object thereby stealing charge away from the electrodes. The amount of charge in each of the electrodes can be measured by the sensing circuit 76 to determine the positions of one or more objects when they touch the touch screen 70. In mutual capacitance, the sensing device 72 can include, on the same layer or different layers, grid of spatially separated lines or wires. In the simplest case, one layer can include lines in rows while the lower layer can include lines in columns (e.g., orthogonal). The sensing points 74 can be provided at the intersections of the rows and columns. During operation, the rows can be charged and the charge can capacitively couple to the columns at the intersection. As an object approaches the surface of the touch screen, the object can capacitive couple to the rows at the intersections in close proximity to the object thereby stealing charge away from the rows and therefore the columns as well. The amount of charge in each of the columns can be measured by the sensing circuit 76 to determine the positions of multiple objects when they touch the touch screen 70.

The touch system and method discussed above in view of FIGS. 1-4 can be designed to detect any contact made by an object with the touch surface, regardless of what type of object is making the contact or whether the contact is intended by the user to be an input. One type of unintentional contact that can be detected on the touch surface can be caused by water on the touch surface. When one or more water drops on the touch surface is grounded, e.g., when a finger is touching the water, the touch system can detect the water drops just as it detects a touch by a grounded finger. Similarly, if the water drop is in the edge area of the device and conducts with the bezel or metal retaining ring which is grounded to the device chassis, it can become grounded and be detectable by the touch sensor panel as a touch. This can happen when, for example, the touch sensor panel is part of a wearable device and sweat comes into contact with the touch screen when the device is worn by the user. It can also happen when the device is worn in the shower or rain.

Figure 5:
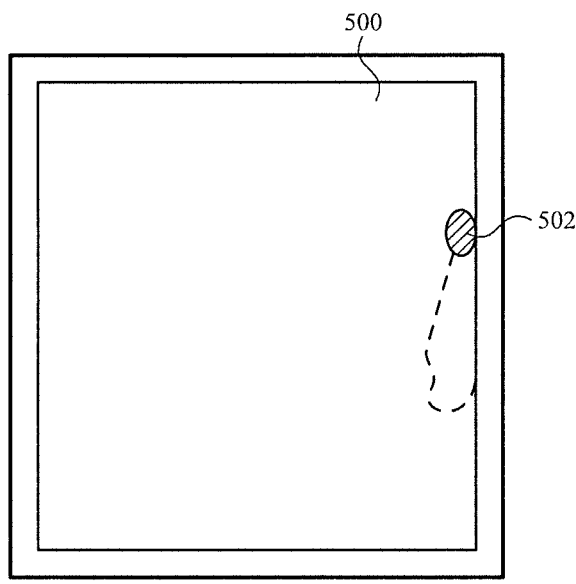
FIG. 5 illustrates a touch image captured from a touch screen, according to an embodiment of the disclosure.

As illustrated in FIG. 5, the contact patch 502 on touch sensor panel 500 can be caused by a water drop at that particular location on the surface of the panel 500. In addition, a water drop may move along the surface of the touch screen while remaining grounded. The movement of a water drop can look similar to a movement of a fingertip to the touch sensor panel. As such, a water drop flowing along the edge of the touch screen can be interpreted as a swipe or scroll by a finger. This may trigger an unintended response (e.g., activating an app or deleting a contact from the address book) from the host device.

In one embodiment, the touch controller (and/or processor) can rely on various data associated with a touch to determine whether the touch is a water drop on the touch surface. For example, a touch detected in the center area of the touch surface is unlikely to be water because water in the center area of the surface is unlikely to be grounded (e.g., in contact with a conductor). In contrast, water near the edge area of the touch sensor panel is more likely to be in contact with the conductive metal bezel and become grounded and detectable by the touch panel. Therefore, a touch closer to the edge of the touch panel is more likely water than one in the middle of the touch panel. Accordingly, the distance between the touch location and the edge of the touch panel (or edge of the device) can be one of the determining factors of whether the touch is caused by a water drop.

Figure 6:
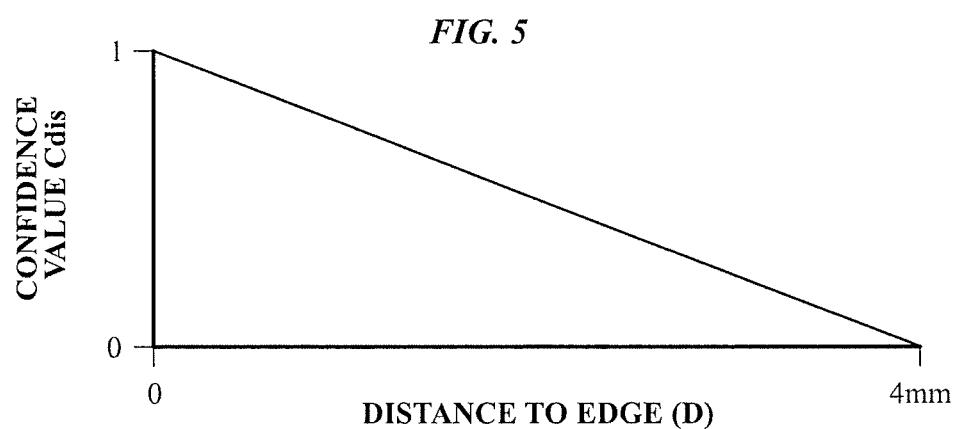
FIG. 6 is a graph illustrating an exemplary correlation between a touch's distance to edge and the likelihood of the touch being a water drop, according to an embodiment of the disclosure.

As illustrated in FIG. 6, a confidence value $C_{dis}$ indicating the likelihood of a touch being from a water drop can be a function of the distance (D) from the location of the touch to one of the edges of the touch panel. In one embodiment, the distance to edge (D) can be a distance from a centroid of the touch to the closest edge. As illustrated in FIG. 6, $C_{dis}$ can be a value between 0 (highly unlikely that the touch is a water drop) and 1 (highly likely that the touch is a water drop). As the distance between the touch and the edge increases, the value of $C_{dis}$ can decrease in, for example, a linear fashion, as shown in the figure. In this embodiment, when the centroid of the touch is beyond a certain distance (e.g., 4 mm) to the edge, the likelihood of the touch being caused by water is greatly diminished (e.g., close to none). In other words, when the distance is more than 4 mm, the touch is almost certainly not water, but an intended touch by, for example, a finger. It should be understood that the number 4 mm is only exemplary. In other embodiments, the distance at which $C_{dis}$ becomes zero (or close to zero) can be other than 4 mm. Similarly, the correlation between distance to edge and the confidence value does not necessarily have to be linear.

Figure 7:
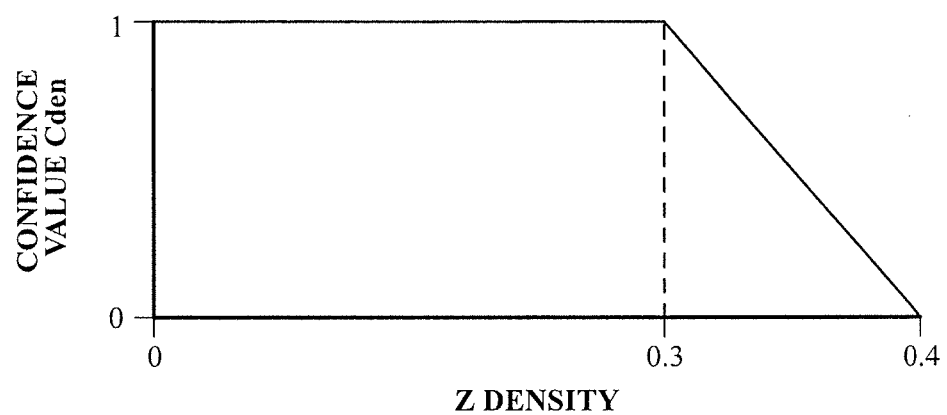
FIG. 7 is a graph illustrating an exemplary correlation between a touch's $Z_{density}$ and the likelihood of the touch being a water drop, according to an embodiment of the disclosure.

A second distinguishing factor between a finger touch and water on the touch panel can be a density (e.g., $Z_{density}$) of the touch. In one embodiment, the density ($Z_{density}$) can be calculated by dividing a normalized sum of capacitance values from the touch area by the radius of the touch area (and thus measured in capacitance/distance). In general, a touch by a water drop tends to have lower $Z_{density}$ than a finger touch because water is usually more spread-out on the touch surface and the capacitance change caused by the grounded water over the spread-out area is less (less dense) than that caused by a finger. Water $Z_{density}$ can roughly be no greater than 0.4, while Finger $Z_{density}$ can typically be much greater (e.g., between 1-1.2). The graph of FIG. 7 illustrates an exemplary correlation between $Z_{density}$ and confidence value $C_{den}$, which indicates how likely the touch is caused by water (1 being highly likely and 0 being very unlikely). As illustrated, when $Z_{density}$ is less than 0.3, $C_{den}$ can be set to 1, which indicates that the touch is almost certain to be caused by water. When $Z_{density}$ is between 0.3 and 0.4, the confidence value $C_{den}$ can decrease with increasing $Z_{density}$, indicating that the touch is more likely a touch by, for example, a finger. When $Z_{density}$ is over 0.4, the touch is almost for sure not caused by water. It should be understood that although the graph in FIG. 7 shows a linear relationship between $Z_{density}$ and the confidence value when $Z_{density}$ is in the range of 0.3 and 0.4, other non-linear relationship can also be adopted to indicate how the confidence value is affected by $Z_{density}$. It should also be understood that a range different from that shown in the graph of FIG. 7 may be adopted in other embodiments.

Figure 8:
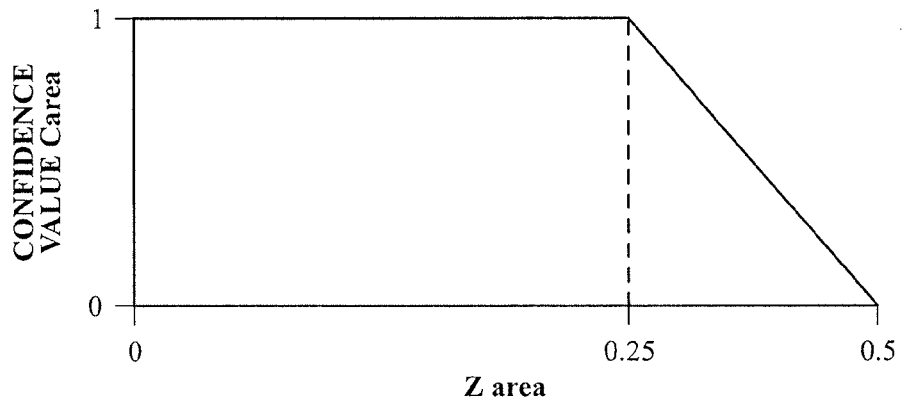
FIG. 8 is a graph illustrating an exemplary correlation between a touch's $Z_{area}$ and the likelihood of the touch being a water drop, according to an embodiment of the disclosure.

Alternatively or additional, an area (e.g., $Z_{area}$) corresponding to the normalized sum of capacitance values over the area of the touch can also indicate whether a captured touch is from a water drop or a finger. In one embodiment, $Z_{area}$ can correlate to the number and strength of pixels affected by the touch and measured in total capacitance change associated with these pixels. A touch caused by a water drop can have relatively low $Z_{area}$ because water tends to break up and form small drops. In comparison, touches by a finger can have a relatively large $Z_{area}$. As illustrated in the chart of FIG. 8, when $Z_{area}$ is less than 0.25, the confidence value $C_{area}$ can be set to 1, which indicates that the touch is almost certainly caused by water. Between 0.25 and 0.5, $C_{area}$ can decrease in a linear fashion as $Z_{area}$ increases. That is, the larger the touch area is, the less likely that the touch is from a water drop. As illustrated in FIG. 8, when $Z_{area}$ is greater than 0.5, confidence value $C_{area}$ can be set to zero, which indicates that the touch is highly unlikely to be a water drop.

A combination of the above-described three factors (e.g., distance to edge D, $Z_{density}$, and $Z_{area}$) can be used for determining whether a touch is likely caused by water and, ultimately, whether the touch should be ignored. In one embodiment, the following formula can be used to calculate a value W based on confidence values $C_{dis}$, $C_{density}$, and $C_{area}$:

$$W=(C_{density}+C_{area})/2*C_{dis}$$

In this embodiment, $C_{density}$ and $C_{area}$ can have equal weight in determining whether the touch is by water. In other embodiments, either $C_{density}$ or $C_{area}$ can be given more weight than the other. W can then be normalized using, for example, the following formula:

$$W_{filt}=\alpha W_{filt}+(1-\alpha)W$$

$\alpha$ can be a constant. In one embodiment, $\alpha$ can be set to 0.7. In one embodiment, when $W_{filt}$ has a value greater than 0.5, it can be determined that the touch is caused by water and should be ignored. It should be understood that, in other embodiments, a different $\alpha$ and threshold value can be used to make the same determination.

In one embodiment, after water touches the touch sensor panel, it can travel along a path on the surface. The path can be tracked by the touch controller. The tracking can be at a per-frame rate. If the touch is initially determined to be a water touch, the subsequent movement of the touch can also be characterized as a water touch as long as the touch is continuous along a path on the surface. This can prevent sudden gesture changes when a touch previously determined to be water is later determined to be a real touch (e.g., a finger touch).

If a touch is determined to be caused by water on the touch surface, it can be ignored and/or reported as a non-touch contact. In some embodiments, the shape of the contact area can be another feature that can be used for distinguishing water touch from a real touch. The shape can be unique to water moving along the surface of the touch screen and unlike any shape corresponding to a conventional touch object such as a finger.

Figure 9:
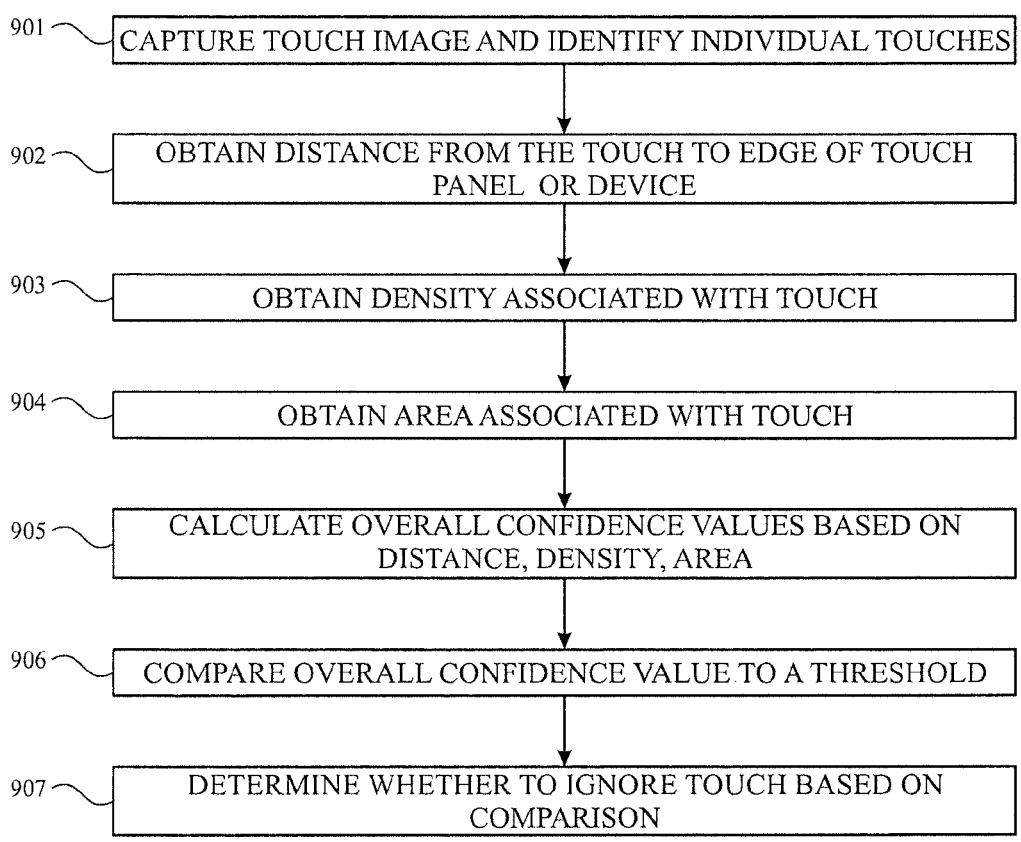
FIG. 9 is a flow chart illustrating the exemplary steps in determining whether a detected touch is caused by water, according to an embodiment of the disclosure.

FIG. 9 is a flow chart illustrating the exemplary steps in determining whether a detected touch is caused by water, according to an embodiment of the disclosure. First, a touch image can be captured from the touch panel and individual touches in the touch image can be identified (step 901). For each individual touch, the touch controller or processor can obtain the distance from the touch to the edge of the touch panel (step 902), a density (step 903), and an area (step 904) associated with the touch. It should be understood that steps 902, 903, 904 can be performed in any order or simultaneously. Next, an overall confidence value (e.g., W in the formula above) can be calculated based on the distance, density, and area (step 905) and compared to a predetermined threshold value (step 906). Depending on whether the overall confidence value W is over the threshold, the touch can be ignored (as being caused by water on the touch surface) or processed as a user-intended touch (e.g., a finger touch) (step 907).

Figure 10:
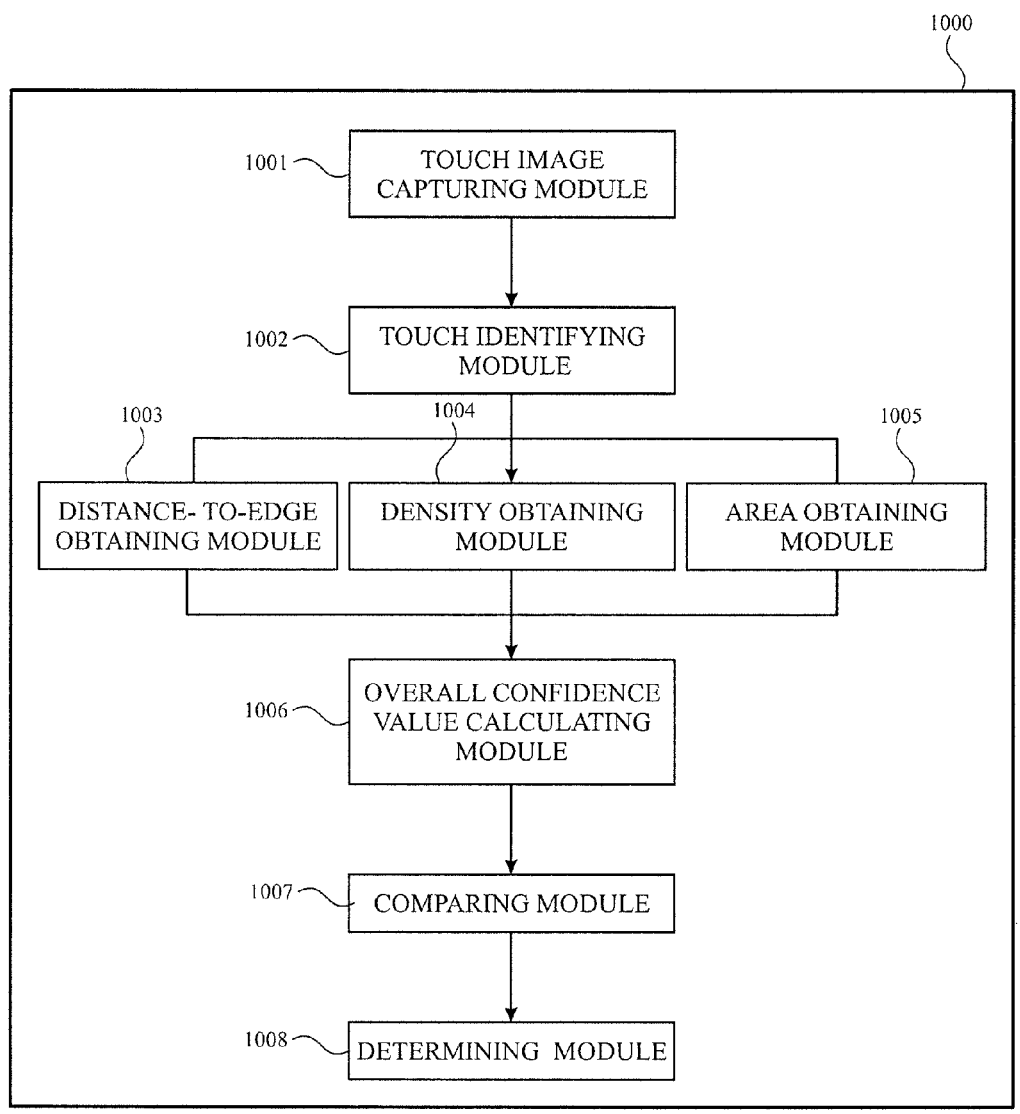
FIG. 10 illustrates the exemplary modules of a touch controller or processor, according to an embodiment of the disclosure.

FIG. 10 illustrates the exemplary modules of a touch controller or processor, according to an embodiment of the disclosure. The touch controller and/or processor 1000 can include one or more of the following modules, each connected to at least one other module: a touch image capturing module 1001 that can capture an touch image from the touch panel; a touch identifying module 1002 that can identify individual touches from the touch image; a distance-to-edge obtaining module 1003 that can obtain the distance from the touch to the edge of the touch panel; a density obtaining module 1004 that can obtain a density associated with the touch; an area obtaining module 1005 that can obtain an area associated with the touch; an overall confidence value calculating module 1006 that can calculate an overall confidence W based on the obtained distance, density, and area; a comparing module 1007 that can compare the overall confidence value to a predetermined threshold value; and a determining module 1008 that can determine whether the touch should be ignored (as being caused by water on the touch surface) or processed as a user-intended touch (e.g., a finger touch) based on the result from the comparing module 1007.

Note that one or more of the functions described above can be performed by software or firmware stored in memory and executed by a processor of the host device. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An apparatus comprising:
a sensing circuit configured to sense a touch sensor panel and thereby capture a touch image; and
one or more processors coupled to the sensing circuit capable of:
identifying one or more contact patches from the touch image; and
for a respective contact patch of the one or more contact patches:
determining a confidence value of the respective contact patch based on an area of the respective contact patch, a signal density of the respective contact patch, and a distance between a location of the respective contact patch and an edge of the touch sensor panel closest to the respective contact patch, wherein the confidence value is indicative of a likelihood that the respective contact patch corresponds to a liquid contacting the touch sensor panel;
in accordance with a determination that the confidence value of the respective contact patch meets a threshold, processing the touch image excluding the respective contact patch to determine one or more touch inputs; and
in accordance with a determination that the confidence value of the respective contact patch fails to meet the threshold, processing the touch image including the respective contact patch to determine the one or more touch inputs.

2. The apparatus of claim 1, the one or more processors further capable of:
for the respective contact patch of the one or more contact patches:
determining the distance between the location of the respective contact patch and the edge of the touch sensor panel closest to the respective contact patch;
determining the signal density of the respective contact patch; and
determining the area of the respective contact patch.

3. The apparatus of claim 2, wherein determining the distance between the location of the respective contact patch and the edge of the touch sensor panel closest to the respective contact patch comprises:
determining a centroid of the respective contact patch; and
determining a shortest distance from the centroid to one of the edges of the touch sensor panel.

4. The apparatus of claim 2, wherein determining the area of the respective contact patch comprises:
identifying one or more touch nodes associated with the respective contact patch; and
measuring a capacitance associated with the identified one or more touch nodes.

5. The apparatus of claim 2, wherein determining the signal density of the respective contact patch comprises:
measuring a total capacitance associated with the respective contact patch;
determining a radius associated with the respective contact patch; and
dividing the total capacitance by the radius.

6. The apparatus of claim 1, wherein determining the confidence value of the respective contact patch comprises:
calculating a first confidence value based on the distance between the location of the respective contact patch and the edge of the touch sensor panel closest to the respective contact patch;
calculating a second confidence value based on the signal density of the respective contact patch;
calculating a third confidence value based on the area of the respective contact patch; and
calculating the confidence value based on the first, second, and third confidence values.

7. The apparatus of claim 6, wherein determining the confidence value of the respective contact patch further comprises:
averaging the second and third confidence values and dividing the average by the first confidence value.

8. The apparatus of claim 1, wherein the one or more processors is further capable of:
normalizing the confidence value.

9. A computer-implemented method, comprising:
identifying one or more contact patches from a touch image; and
for a respective contact patch of the one or more contact patches:
determining a confidence value of the respective contact patch based on an area of the respective contact patch, a signal density of the respective contact patch, and a distance between a location of the respective contact patch and an edge of the touch sensor panel closest to the respective contact patch, wherein the confidence value is indicative of a likelihood that the respective contact patch corresponds to a liquid contacting the touch sensor panel;
in accordance with a determination that the confidence value of the respective contact patch meets a threshold, processing the touch image excluding the respective contact patch to determine one or more touch inputs; and
in accordance with a determination that the confidence value of the respective contact patch fails to meet the threshold, processing the touch image including the respective contact patch to determine the one or more touch inputs.

10. The computer-implemented method of claim 9, further comprising:
for the respective contact patch of the one or more contact patches:
determining the distance between the location of the respective contact patch and the edge of the touch sensor panel closest to the respective contact patch;
determining the area of the respective contact patch; and
determining the signal density of the respective contact patch.

11. The computer-implemented method of claim 10, wherein determining the distance between the location of the respective contact patch and the edge of the touch sensor panel closest to the respective contact patch comprises:
determining a centroid of the respective contact patch; and
determining a shortest distance from the centroid to one of the edges of the touch sensor panel.

12. The computer-implemented method of claim 10, wherein determining the area of the respective contact patch comprises:
identifying one or more touch nodes associated with the respective contact patch; and measuring a capacitance associated with the identified one or more touch nodes.

13. The computer-implemented method of claim 10, wherein determining the signal density of the respective contact patch comprises:
    measuring a total capacitance associated with the respective contact patch;
    determining a radius associated with the respective contact patch; and
    dividing the total capacitance by the radius.

14. The computer-implemented method of claim 9, wherein determining the confidence value of the respective contact patch further comprises:
    calculating a first confidence value based on the distance between the location of the respective contact patch and the edge of the touch sensor panel closest to the respective contact patch;
    calculating a second confidence value based on the signal density of the respective contact patch;
    calculating a third confidence value based on the area of the respective contact patch; and
    calculating the confidence value based on the first, second, and third confidence values.

15. The computer-implemented method of claim 14, wherein determining the confidence value of the respective contact patch comprises averaging the second and third confidence values and dividing the average by the first confidence value.

16. The computer-implemented method of claim 15, wherein determining the confidence value of the respective contact patch further comprises normalizing the confidence value.

17. A computer-implemented method for determining whether one or more contact patches correspond to a liquid contacting a touch sensor panel, the method comprising:
    detecting the one or more contact patches on the touch sensor panel; and
    for a respective contact patch of the one or more contact patches:
        determining an area associated with the respective contact patch;
        determining a signal density associated with the respective contact patch;
        determining a distance between a location of the respective contact patch and an edge of the touch sensor panel closest to the respective contact patch; and
        determining whether the respective contact patch corresponds to the liquid contacting the touch sensor panel based on a combination of the area, the signal density, and the distance associated with the respective contact patch, wherein the determining includes an indication of a likelihood that the respective contact patch corresponds to the liquid contacting the touch sensor panel.

18. The computer-implemented method of claim 17, wherein determining whether the one or more contact patches correspond to the liquid contacting the touch sensor panel further comprises:
    for the respective contact patch of the one or more contact patches:
        determining the respective contact patch to more likely correspond to the liquid when the area of the respective contact patch is less than an area threshold.

19. The computer-implemented method of claim 17, wherein determining whether the one or more contact patches correspond to the liquid contacting the touch sensor panel further comprises:
    for the respective contact patch of the one or more contact patches:
        determining the respective contact patch to more likely correspond to the liquid when the signal density of the respective contact patch is less than a signal density threshold.

20. The computer-implemented method of claim 17, wherein determining whether the one or more contact patches correspond to the liquid contacting the touch sensor panel further comprises:
    for the respective contact patch of the one or more contact patches:
        determining the respective contact patch to more likely correspond to the liquid as the distance between the location of the respective contact patch and the edge of the touch sensor panel closest to the respective contact patch decreases.

21. The computer-implemented method of claim 17, wherein determining whether the one or more contact patches correspond to the liquid contacting the touch sensor panel further comprises:
    for the respective contact patch of the one or more contact patches:
        weighting the area or the signal density of the respective contact patch.

* * * * *